Dec. 13, 1955

A. J. SAULINO 2,726,925

METHOD OF MAKING CURING BAGS

Filed Dec. 17, 1951

INVENTOR.
ANTHONY J. SAULINO
BY James J. Long

AGENT

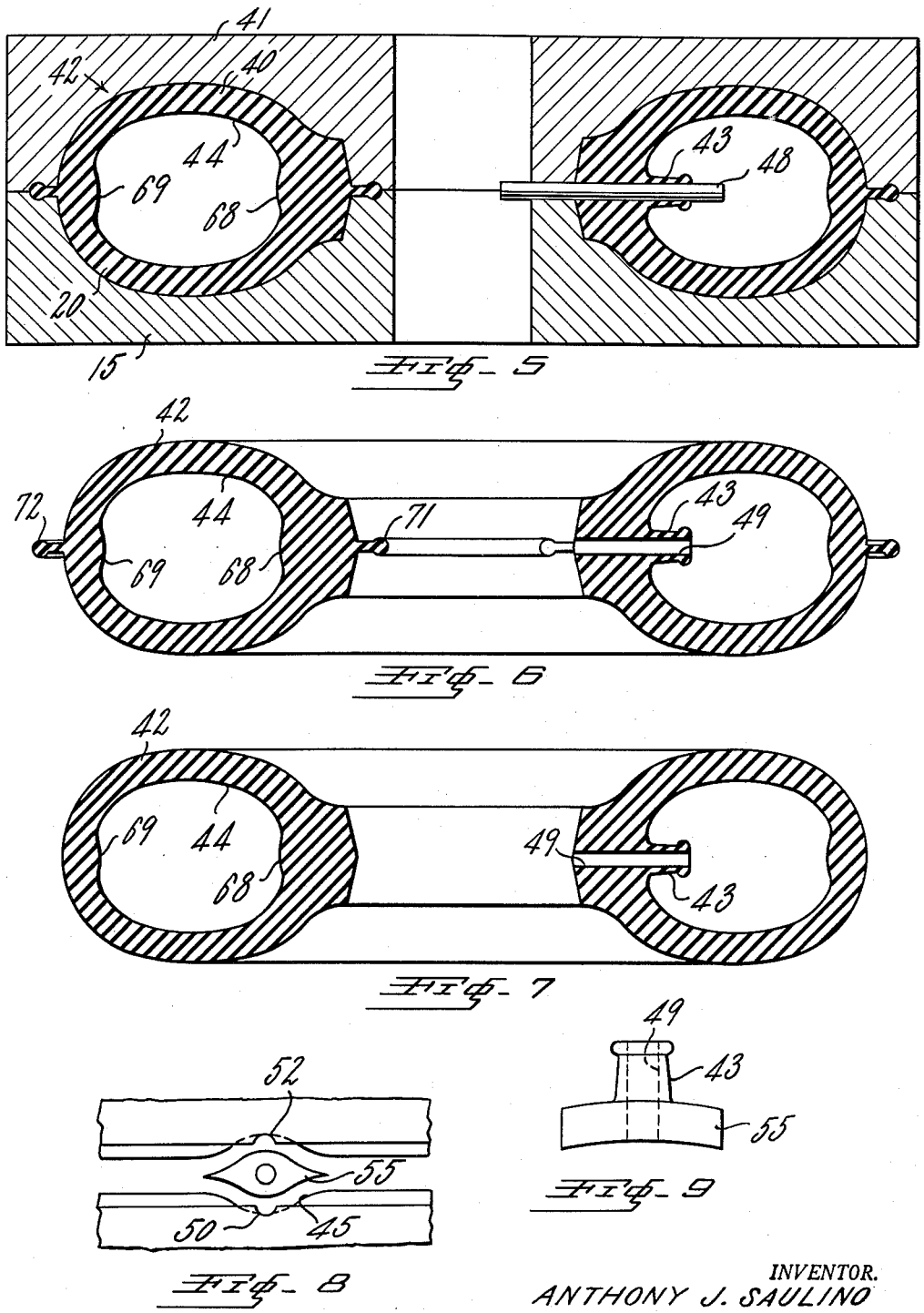

United States Patent Office 2,726,925
Patented Dec. 13, 1955

2,726,925

METHOD OF MAKING CURING BAGS

Anthony J. Saulino, Detroit, Mich., assignor to United States Rubber Company, New York, N. Y., a corporation of New Jersey Application December 17, 1951, Serial No. 262,073

1 Claim. (Cl. 18—59)

This invention relates to a method of making curing bags for use in the manufacture of pneumatic tires.

In the manufacture of tires, the tire is vulcanized or cured in the desired shape in a mold with the aid of a curing bag, which is an inflatable annular toroidal form, usually made of extensible rubbery or resilient material, such as butyl rubber, and having an external contour corresponding to the interior profile of the tire casing within which the bag is disposed. The curing bag has a hollow interior and is provided with one or more inlets by means of which the bag may be filled or inflated with a fluid shaping and heating medium under pressure, such as hot water or steam. The curing bag thus serves to apply internal pressure and heat to the raw tire casing in the process of shaping and curing the casing. After the tire is cured and removed from the vulcanizing mold, the curing bag is removed, and reinserted in another raw tire casing, and the bag is repeatedly reused in this manner until it eventually deteriorates from continual handling and repeated exposure to vulcanizing conditions.

Because of the rough handling to which the curing bag is subjected, it is necessary that it be made strong and rugged, and capable of continued use without developing leaks. The smallest leak in the curing bag can lead to a tire which is improperly cured, and therefore defective. Also, it is important that the curing bag be capable of transmitting heat to the interior of the tire casing in such manner that the various parts of the casing are uniformly cured.

Curing bags made according to the conventional practices have not always proven satisfactory in regard to these requirements, because of certain difficulties inherent in the conventional methods of making curing bags. It has been general practice to form the curing bags by butt-splicing straight tubular lengths into annular form. This method has a number of objectionable features. In the first place, it is difficult to obtain an adequately strong splice in the bag. Secondly, the location of the splice usually provides a heavier portion in the curing bag resulting in objectionable non-uniformity of the bag itself and causing corresponding non-uniformity in the transfer of heat from the interior of the bag to the tire casing. Also, when a curing bag is formed into circular shape from straight tubular stock, the composition in the bag is stretched at the outer periphery and compressed at the inner periphery. This leads to irregularities in the thickness of the stock and causes thin spots, particularly in some localities at the outer periphery of the bag.

Additionally, the foregoing conventional practice made it necessary to make the entire wall of the bag considerably thicker than would otherwise be desirable, principally because of an inherent lack of adequate gauge control in the extrusion operation. Such excessive thickness in the bag walls not only represented a waste of material, but also occasioned an increase in the time required to cure a tire casing, because of the delay in heat transfer caused by the excessively thick curing bag walls.

Accordingly, it is an object of the present invention to provide an improved method of manufacturing curing bags, which can be carried out conveniently and economically, and which produces a strong curing bag, free from undesirable irregularities, and capable of transmitting heat to a tire casing in the most effective manner.

The manner in which the invention accomplishes the foregoing and additional objects and advantages will be made manifest in the foregoing detailed description, which is intended to be read with reference to the accompanying drawings, wherein:

Fig. 5 is a similar view showing the mold members brought together to unite the two halves of the curing bag;

Fig. 6 is a similar view of the curing bag as removed from the mold;

Fig. 7 is a similar view of the finished bag;

Fig. 8 is a fragmentary view taken along the line 8—8 of Fig. 4, showing how the valve stem fits between the mold halves; and Fig. 9 is a somewhat enlarged plan view of a preformed valve stem, before insertion in the assembly.

According to the method of the invention, the curing bag is initially shaped, by a process involving compression molding, in the form of two trans-axial halves which are spliced together along circumferential lines of splice, while still retained in the molds in which they were initially shaped. The spliced halves are then vulcanized while remaining in place in their original shaping molds.

Figure 1:
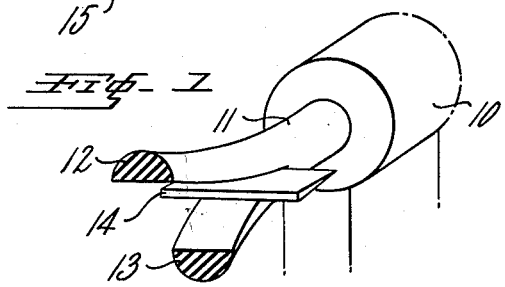
Fig. 1 is a largely diagrammatic fragmentary perspective view of an extruding device for preshaping rubber stock from which a curing bag is to be formed.

Referring to the drawing, Fig. 1 shows the raw vulcanizable rubber stock, usually butyl rubber, from which the curing bag is to be made, being extruded in a heated plastic condition from an extruding device 10 in the form of a continuous solid rod 11 of circular cross section. The solid rod 11 of rubber stock may be used as such, or may be split longitudinally into two semi-circular halves 12 and 13 by means of a knife 14 disposed across the path of the stock. The solid rod 11, or the semi-circular forms 12 and 13 split therefrom, are cut into lengths corresponding to the circumference of the curing bag, each such form containing a predetermined definite weight of stock sufficient to form one-half of the curing bag. For example, in making a curing bag for a conventional 6.00/16 pneumatic tire, the form 12 might weigh 17 lbs. and might be 79 inches in length. In place of extruding the curing bag stock in circular cross-section, the stock may, if desired, be extruded in semi-circular cross-section. The purpose of this step of the process is to provide a definite quantity of raw curing bag stock in a shape that is readily compression moldable into the form of a trans-axial half of the curing bag.

Figure 2:
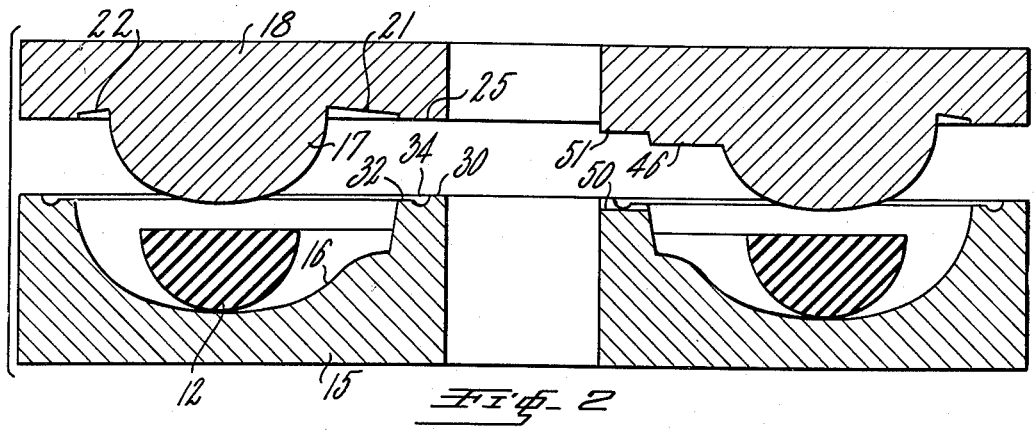
Fig. 2 is a transverse view in section of mold members for shaping a trans-axial half of the curing bag from the extruded body of rubber stock, shown contained in the lower mold member.

For molding the stock, there is provided a lower female mold shell 15, having in its upper surface an annular cavity 16, into which an annular projection 17 of an upper cooperating male mold half 18 is adapted to extend, thereby defining an annular closed mold cavity 19 (Fig. 3), having the general shape of a trans-axial half of the curing bag. With the mold halves 15, 18 in the open position, as shown in Fig. 2, the proper weight of raw stock 12, conveniently spliced into annular form, is laid in the cavity 16 of the mold shell 15 with the circular surface of the form 12 facing downwardly. The stock is in a heated condition when placed in the mold shell, and for this purpose the stock may be placed previously in a water tank for about 20 to 30 minutes at a temperature of about 160 to 200° F., preparatory to placing the stock in a mold. This heats the stock sufficiently so that is is readily susceptible to deformation. The mold shell 15 is also heated to an elevated temperature. When using the usual butyl rubber stock, the mold shell 15 is preferably heated to a temperature of at least 150° F., while the male mold core 18 is maintained at a lower temperature, and is preferably kept substantially at about room temperature, which will usually be from about 60 to 90° F. Since the rubber stock adheres more readily to the warmer mold surface, this insures that the adhesion of the raw rubber stock to the surface of the female mold shell 15 will be greater than the adhesion of the stock to the male core 18. Usually the temperature of the mold shell is maintained by retaining the shell in a heated molding press. To further insure that the adhesion of the stock to the mold shell 15 will be greater than to the core 18, the surface of the mold shell is kept free of lubricant, dirt, oil, rust, or other foreign material that would interfere with adhesion of the stock to the shell surface, while the surface of the core 18 is coated with a suitable mold lubricant to prevent the stock from adhering thereto. For example, a thin film of a 10% solution of butyl carbitol in gasoline may be applied to the surface of the core 18.

The mold core 18 is forced into the mold shell 15 under pressure, thereby compression-molding the raw stock 12 in the form of a trans-axial half 20 of the curing bag within the cavity 19. Preferably the mold halves are initially urged together under relatively low pressure, and then pressed together at a higher pressure, which is maintained for a period of about 40 seconds.

Figure 3:
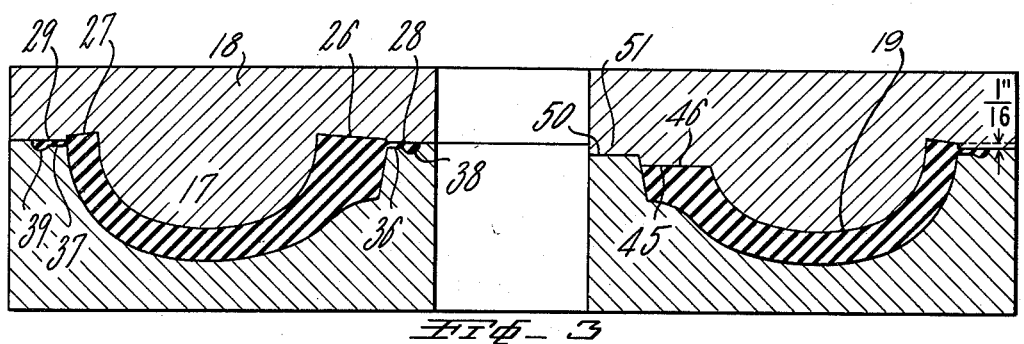
Fig. 3 is a similar view showing the mold members pressed together to shape the rubber stock.

The surfaces of the mold core 18 at either side of the projection 17 include annular recesses 21, 22 extending upwardly from the parting line 25 of the mold at an angle, suitably at an angle of approximately 10°. This provides at the edge faces of the molded half 20 projecting portions 26, 27 of increasing thickness toward the center of the curing bag cavity, representing an excess of material at the surfaces of the curing bag half which will subsequently be spliced to corresponding surfaces of a similar bag half to form the complete bag. The recesses 21, 22 provide for projection of the edge faces of the curing bag above the central trans-axial plane of the curing bag to the extent of at least about 1/16" at the outer peripheral edges, as indicated in Fig. 3.

In order to prevent the molded curing bag 20 from separating from the edges of the cavity 10 of the mold shell 15 when the core 18 is subsequently removed, provision is made for formation of integral anchoring members 28, 29 at the inner and outer edges of the curing bag half 20, which interlock with the upper faces 30, 31 of the mold shell. To form such anchor members, slight recesses 32, 33 are provided at the inner and outer edges of the cavity 16 in the mold faces 30, 31. These recesses extend outwardly from the mold cavity 16 into communication with more deeply cut recesses 34, 35 in the surfaces 30, 31. The recesses 32, 33, in cooperation with the undersurface 25 of the core piece 18, define lateral extensions of the mold cavity 16 into which the stock 12 flows during the molding operation to form integral webs 36, 37 extending from the inner and outer peripheries of the edge of the curing bag half 20. The webs 36, 37 are in turn integrally connected at their outer edges with enlarged bead-like formations 38, 39 formed as a result of flow of the rubber stock into cavities defined by the deeper recesses 34, 35. The beads 38, 39 serve as anchors which prevent the stock from separating from the mold after the molding operation and prior to the curing of the bag. The definite quantity or weight of rubber stock provided in the original shape 12 is just sufficient to fill out the entire mold cavity, including the marginal recesses for forming the anchor beads, and additionally includes a small amount of excess material, typically about 1% excess, which escapes from the edges of the mold cavity in the form of flash.

Figure 4:
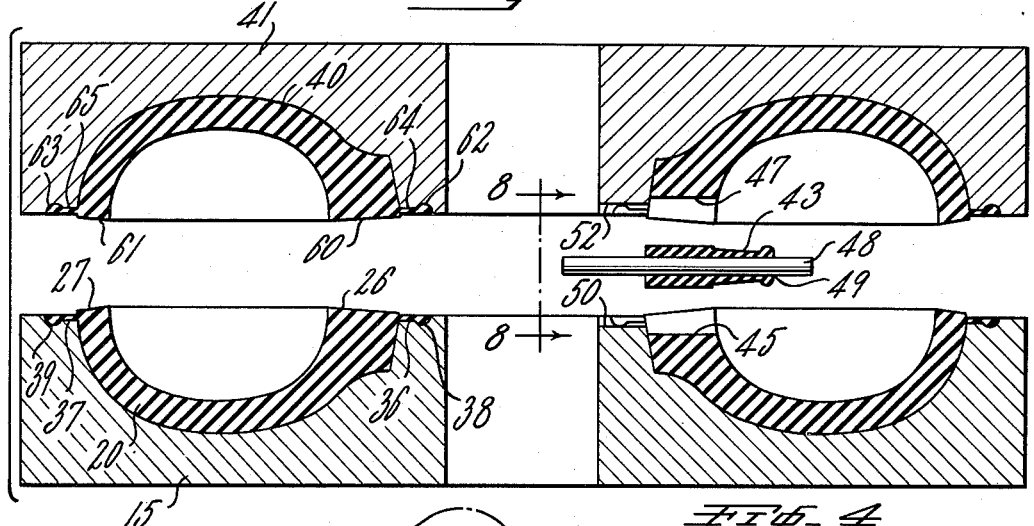
Fig. 4 is a similar view showing two mold members, each containing a shaped trans-axial half of a curing bag, arranged in opposition, with a valve stem therebetween, preparatory to uniting the two halves.

After the molding operation, the core 18 is lifted from the mold shell 15, leaving the molded curing bag half 20 within the shell 15, as indicated in Fig. 4. The molded bag half 20 remains adhered to the surface of the shell, rather than the surface of the core, because the core surface is lubricated, while the mold surface is not, and because of the relatively higher temperature, and consequent relatively higher adhesion, of the surface of the shell. There is ordinarily an inherent tendency for the molded rubber stock 20 to pull away from the surface of the mold shell cavity, especially at its edges, because of the inherent elasticity of the stock, which tends to cause it to shrink, or return to its original shape. However, the beads of stock 38, 39 contained in the recesses 34, 35 serve to anchor the edges of the molded form 20 in place, and prevent it from separating from the mold shell.

In a similar manner, a second curing bag half 40 is formed in a mold shell 41 similar to the mold shell 15, and by bringing the two mold shells 15, 41 together in oppositely disposed relation, with one mold shell in an inverted position, as indicated in Figs. 4 and 5, the two curing bag halves 20, 40 are united to form a complete curing bag 42. In this operation, a resilient valve stem 43 is also associated with the curing bag, to provide a means of introducing a heated fluid medium into the interior cavity 44 of the bag. To accommodate the stem 43, a recess 45 is formed at one point on the interior diameter of the bag half 20, by means of a lug or projection 46 extending from the under surface of the mold core 18. A similar recess 47 is formed in the upper curing bag half 40. To accommodate a rigid slidable connecting tube 48 that is inserted through the entrance passageway 49 of the valve stem 43, the mold shell 15 is also provided with a semi-circular recess 50 of appropriate diameter, extending to the inner periphery of the mold shell, and the mold core is provided with a cooperating projection 51 that fits into the recess 50 during the first molding operation. A similar semi-circular recess 52 is provided in the mold shell 41. The valve stem 43 is made with an elongated base portion 55, having a curvature corresponding to the curvature of the inner wall of the curing bag, as indicated in Fig. 9, and it is provided with gradually tapered portions extending circumferentially, as best seen in Fig. 8. The stem 43 is previously molded and partially cured in the desired shape and the surfaces of the base portion 55 are buffed and cemented to insure a good bond. The recess 45, 47 in the curing bag halves 20, 40 which accommodate the stem 43 are similarly shaped. This insures adequate adhesion of the valve stem to the body of the curing bag.

The upper curing bag half 40 is formed similarly to the lower half 20 and is also provided with tapered projections 60, 61 at its edge faces. Similarly, bead or anchoring portions 62, 63 recessed into the surface of the mold shell 41, and connected to the inner and outer peripheries of the curing bag half 40 by integral webs 64, 65 are also provided. When the mold shells 15, 41 are brought together to splice the curing halves 20, 40 circumferentially, the two curing bag halves contact each other initially at the portions of the tapered faces 26, 27, 60, 61 toward the center of the bag cavity. This insures an adequate adhesion of the inner surfaces which are less supported by the mold shells. Also, the tapered faces assist in removal of any trapped air as the splice is being made. As the splice is made, the excess material represented by the inclined projections 26, 27, 60, 61 is urged inwardly toward the curing bag cavity, thereby forming definite projecting portions or bulges 68, 69 along the inner and outer circumferential lines of splice. The bulges 68, 69 represent a substantial reinforcement of the walls of the bag at the lines of splice, where additional strength is most needed.

Immediately prior to bringing the two bag halves together to effect the circumferential splice the edge faces 26, 27, 60 and 61 of the two bag halves are activated, as by scrubbing with a wire brush dipped in gasoline. This insures good adhesion at the splice. It has furthermore been found that the most satisfactory splice is obtained by splicing the two bag halves together as soon as possible after the molding operation, and preferably within about 10 minutes or less after molding. The stock is still warm and tacky at this time, and it is found that a better bond is obtained than if the bag halves are permitted to age for a time, with consequent cooling of the stock and possible accumulation of moisture or dirt on the surfaces to be spliced.

At the same time that the curing bag halves are spliced together, the sealing stem assembly 43 is also enclosed in its proper position between the two halves as shown in Fig. 5. The entire assembly is then vulcanized, by subjecting the mold halves 15, 41 containing the completely formed curing bag 42 to external heating to raise the bag stock to vulcanizing temperature and at the same time introducing a heated fluid medium, such as hot water or steam, to the interior cavity 44 of the bag through the connecting tube 48 passing through the valve stem 43. After the vulcanization is complete, the completed bag 42 is removed from the mold shells and has the appearance shown in Fig. 6, wherein are seen the circumferentially extending projections 71, 72 at the inner and outer peripheries of the bag, resulting from a fusion of the integral anchor members that were provided on each of the curing bag halves. The projections 71, 72 are trimmed off, as by means of a knife, and the finished curing bag has the appearance shown in Fig. 7.

When formed as described, the resulting curing bag is exceptionally uniform and strong. The thickened portions or bulges formed along the circumferential lines of splice not only represent a reinforcement of the walls of the bag at the splice but also provide for more advantageous heat distribution to the tire casing during vulcanization. This will be understood from a consideration of the fact that the proportionately lighter or thinner portions of the tire casing require a proportionately lesser amount of heat than the relative heavier or thicker portions of the tire, for uniform cure. Thus, the bulge located at the crown of the curing bag results in transfer of a proportionately less amount of heat to the center of the crown portion of the tire casing, compared to the areas at either side of the crown, namely, the shoulder areas. Since the center of the crown of the tire is thinner or lighter than the shoulder areas, such limiting of the amount of heat transferred thereto, compared to the amount transmitted to the shoulders, tends to produce a more uniform cure. Similarly the bulge at the base of the curing bag results in a retarded heat flow through the base, relative to the heat flow at the areas adjacent the base, where more heat is required, due to the fact that the tire beads are relatively heavier and thicker.

The formation of internal bulges in the curing bag along the lines of splice is made possible by the manner in which the inclined raised portions are provided at the edge faces of the curing bag halves. As the halves are brought together, the excess material represented by these raised portions necessarily flows radially inwardly. Such inward displacement of the excess stock is made possible because the stock cannot flow outwardly, since the outer wall of the bag and the anchor members attached thereto are totally enclosed and confined by contact with the surface of the mold shell. The quantity of raw rubber stock charged to the molds initially is sufficient to provide this excess material, as well as sufficient material to fill out completely the peripheral recess forming the anchor members.

The formation of the anchor members to prevent the molded curing bag half from separating from the mold shell when the mold core is removed is a particularly advantageous feature of the invention. Without such anchoring members, the molded bag half would tend to separate from the mold shell after the core was removed, making it difficult to effect a proper union of the two bag halves. The anchors prevent this by providing an extension of the edges of the bag half which is relatively undercut with respect to the edge of the bag wall, that is, the anchor extends, at a point radially spaced from the bag wall, to a greater depth below the face of the mold shell than the edge of the bag wall itself. There is thus formed, in effect, a hook-like anchor that prevents the molded bag wall from pulling away from the edges of the mold shell cavity. This feature is especially valuable with stocks which have high shrinkage characteristics and is effective with any stock in eliminating blemishes at the crown of the bag.

Another feature of the invention that makes possible an exceptionally well formed, uniform curing bag lies in the manner in which the molded curing bag half remains within the mold in which it is originally formed, throughout the splicing and vulcanizing operations. There is therefore no opportunity for the bag halves to become stretched or otherwise deformed by handling, since they are at all times supported in the desired shape by the mold shells.

The present method makes it feasible to make the curing bag walls considerably thinner than has heretofore been considered practicable. A principal reason for this is that the variability inherent in the prior art manufacture of curing bags made it necessary to allow broad tolerances in the specified thickness of the bag wall. Lack of control of the wall thickness in tubing, in handling, in splicing, and in proper placement of the tubed bag in the bag curing mold, all made it necessary to provide a greater wall thickness than would otherwise be desirable, as a precaution against localized areas of excessively thin gauge. The inherent uniformity of the bag wall thickness in the present method makes it possible, in contrast to this, to specify a very thin gauge, which is readily maintained accurately in practice. Such thin walls are particularly desirable because they make possible more rapid curing of tires, due to increased heat transfer, and they can be handled with greater ease.

Having thus described my invention, what I claim and desire to protect by Letters Patent is:

A method of making a curing bag by molding comprising in combination the steps of providing a definite quantity of raw vulcanizable rubber stock in a shape roughly approximating the shape of a trans-axial half of the curing bag, said raw rubber stock being inherently elastic and tending to shrink and return to its original shape after being molded, molding the said raw rubber shape at an elevated temperature to compress it into the form of a trans-axial half of the curing bag, simultaneously forming during said molding operation relatively thin circumferential connecting webs of rubber stock extending radially from the inner and outer peripheral edges of such curing bag half in a plane corresponding to the parting face of a mold in which the rubber stock is formed and terminating in relatively thickened annular anchor beads at the outer edges of said webs, said thicker anchor beads being radially spaced from the edges of the curing bag half, and said thickened anchored beads extending below the plane of said webs with respect to the curing bag edges, whereby such beads and webs serve to anchor the curing bag half to the edges of a mold cavity in which said curing bag half is formed and thereby obviating distortion of the curing bag half as a consequence of the said tendency of the molded raw stock to shrink and change shape after molding, similarly forming an identical second curing bag half of raw rubber stock, bringing the two such raw curing bag halves together in face-to-face relationship to effect a circumferential splice and thus form a whole curing bag, and vulcanizing the thus-formed curing bag by application of heat.

References Cited in the file of this patent

UNITED STATES PATENTS

| | | |
|---|---|---|
| 634,866 | Beasley | Oct. 17, 1899 |
| 1,146,523 | Roberts | July 13, 1915 |
| 2,324,974 | Greenup | July 20, 1943 |
| 2,497,226 | McNeil | Feb. 14, 1950 |